United States Patent
Mauritz et al.

(10) Patent No.: US 12,513,738 B2
(45) Date of Patent: Dec. 30, 2025

(54) PREAMBLE DETECTION DURING A RANDOM ACCESS PROCEDURE

(71) Applicant: Telefonaktiebolaget LM Ericsson (publ), Stockholm (SE)

(72) Inventors: Oskar Mauritz, Johanneshov (SE); Tomas Lagerqvist, Stockholm (SE); Magnus Hurd, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 513 days.

(21) Appl. No.: 18/019,092

(22) PCT Filed: Aug. 4, 2020

(86) PCT No.: PCT/IB2020/057367
§ 371 (c)(1),
(2) Date: Jan. 31, 2023

(87) PCT Pub. No.: WO2022/029467
PCT Pub. Date: Feb. 10, 2022

(65) Prior Publication Data
US 2023/0284278 A1 Sep. 7, 2023

(51) Int. Cl.
*H04W 74/00* (2009.01)
*H04W 74/0833* (2024.01)

(52) U.S. Cl.
CPC ..... *H04W 74/004* (2013.01); *H04W 74/0833* (2013.01)

(58) Field of Classification Search
CPC ........... H04W 74/004; H04W 74/0833; H04W 74/04; H04W 48/00
See application file for complete search history.

(56) References Cited

U.S. PATENT DOCUMENTS

| 2016/0234861 A1* | 8/2016 | Ye ..................... H04W 74/0808 |
| 2019/0349584 A1* | 11/2019 | Gordon ................ H04N 19/136 |
| 2020/0028565 A1 | 1/2020 | Rune et al. |

(Continued)

FOREIGN PATENT DOCUMENTS

| WO | 2019/219180 A1 | 11/2019 |
| WO | 2019/219180 A9 | 11/2019 |
| WO | 2021/228349 A1 | 11/2021 |

OTHER PUBLICATIONS

International Search Report and Written Opinion dated Apr. 22, 2021 issued in International Patent Application No. PCT/IB2020/057367 (12 pages).

(Continued)

*Primary Examiner* — Brandon M Renner
*Assistant Examiner* — Jesse P. Samluk
(74) *Attorney, Agent, or Firm* — Rothwell, Figg, Ernst & Manbeck, P.C.

(57) ABSTRACT

A RAP detection procedure that can be used to find the best narrow beam in an efficient manner. In a first step, an access point correlates an incoming signal with appropriate RAPs and then selects at least one candidate RAP for further processing in at least one set of narrow beams that all reside within the coverage area of a wide beam with which the candidate preamble is associated. For each candidate RAP, a second step is executed including narrow beamforming and a PRACH receiver chain including threshold comparison.

20 Claims, 7 Drawing Sheets

(56) References Cited

U.S. PATENT DOCUMENTS

2020/0037361 A1* 1/2020 Chakraborty ......... H04W 72/23
2020/0107369 A1   4/2020 Jeon et al.
2021/0337442 A1* 10/2021 Da Silva ................ H04B 7/022

OTHER PUBLICATIONS

LG Electronics Inc., "Potential impact of beam sweeping on RA", R2-1703497 (Resubmission of R2-1701538), 3GPP TSG-RAN WG2 Meeting #97bis, Spokane, USA, Apr. 3-7, 2017, XP051245347 (3 pages).
Sesia, S. et al., "LTE—The Umts Long Term Evolution: From Theory to Practice", Second Edition, including Release 10 for LTE-Advanced, 2011, John Wiley & Sons Ltd. (11 pages).
ETSI TS 138 211 V15.8.0, Jan. 2020, Technical Specification, 5G; NR; Physical channels and modulation (3GPP TS 38.211 version 15.8.0 Release 15) (100 pages).
3GPP TS 38.214 V15.9.0, Mar. 2020, Technical Specification, 3rd Generation Partnership Project; Technical Specification Group Radio Access Network; NR; Physical layer procedures for data (Release 15) (107 pages).
ETSI TS 138 213 V15.8.0, Jan. 2020, Technical Specification, 5G; NR; Physical layer procedures for control (3GPP TS 38.213 version 15.8.0 Release 15) (112 pages).

\* cited by examiner

PREAMBLE DETECTION DURING A RANDOM ACCESS PROCEDURE

CROSS REFERENCE TO RELATED APPLICATIONS

This application is a 35 U.S.C. § 371 National Stage of International Patent Application No. PCT/IB2020/057367, filed 2020 Aug. 4.

TECHNICAL FIELD

Disclosed are embodiments related to detecting a preamble transmitted by a user equipment (UE) as part of a random access procedure.

BACKGROUND 1.3GPP New Radio (NR) Initial Access

Before a UE (i.e., a communication device capable of communicating wirelessly with an access point (e.g., a base station)) establishes logical connection (e.g. Radio Resource Control (RRC) connection) with an access point, the UE must perform what is known as "cell search" to find, identify, and synchronize with a cell served by the access point. Then, the UE must acquire basic system information, and perform an access barring check to determine whether or not the UE is allowed to use the cell for network connectivity. If the access is allowed, the UE will then perform what is known as a "random access procedure" to establish the logical connection (e.g., RRC connection) with the access point. Examples of UEs include: smartphones, sensors, appliances, meters, computers, servers, etc.

1.1. New Radio (NR) Cell Search and System Information Acquisition

In NR, the combination of synchronization signals (SSs) and a physical broadcast channel (PBCH) is referred to as a SS/PBCH block (a.k.a., Synchronization Signal Block (SSB)). Similar to Long Term Evolution (LTE), a pair of synchronization signals (i.e., a primary synchronization signal (PSS) and secondary synchronization signal (SSS)) is periodically transmitted on downlink from each cell to allow a UE to initially access to the network. By detecting SS, a UE can obtain the physical cell identity, achieve downlink synchronization in both time and frequency, and acquire the timing for PBCH. The PBCH carries the master information block (MIB), which contains system information that enables a UE to acquire System Information Block 1 (SIB1). SIB1 carries system information that enables the UE to perform the random-access procedure.

1.2. NR 4-Step Random Access Procedure

The 4-step random access procedure, also referred to as the Type-1 random access procedure in 3GPP TS 38.213 V16.0.0 ("TS 38.213"). In a first step, a UE initiates the random-access procedure by transmitting a random-access preamble (RAP) (a.k.a., "Message 1" or "Msg 1") on the Physical Random Access Channel (PRACH). In NR, the time and frequency resource on which a random-access preamble (Msg1) is transmitted is defined as a PRACH occasion.

After detecting the Msg1, the gNB responds by transmitting to the UE on the Physical Downlink Control Channel (PDCCH) Downlink Control Information (DCI) (e.g., DCI format 1_0) to prepare the UE to receive a random-access response (RAR) (a.k.a., "Message 2" or "Msg2") and then sends the RAR on the Physical Downlink Shared Channel (PDSCH). In the third step, after successfully decoding Msg2, the UE continues the procedure by transmitting message (a.k.a., "Message 3" or "Msg3") on the Physical Uplink Shared Channel (PUSCH). Msg3 is or contains an RRC connection establishment request. In the last step of the procedure, the gNB transmits a message (a.k.a., "Message 4" or "Msg4") on the Physical Downlink Shared Channel (PDSCH) for contention resolution. It may be the case that more than one UE transmits the same random-access preamble using the same PRACH time/frequency resource. This creates a preamble "collision," which is also called contention. One of the main purposes of applying Step 3 and Step 4 is to resolve such potential contention.

1.3. NR 2-Step Random Access Procedure

The 2-step random access produce is also referred to as Type-2 random access procedure in TS 38.213. In the first step, a UE sends on the PUSCH a first message (MsgA) that includes a random access preamble together with higher layer data such as an RRC connection request possibly with some small payload. After detecting the MsgA, the access point sends to the UE DCI (e.g., DCI format 1_0) on the PDCCH and then sends an RAR (a.k.a., "MsgB") which includes a UE identifier assignment, timing advance information, contention resolution message, etc.

2. NR Beamforming

NR aims for communication at very high frequency. This frequency domain is in 3GPP referred to as deployment on frequency range 2 (FR2) representing frequencies higher than 6 GHz. For highband deployment the coverage is challenging. Therefore, Advanced antenna systems (AAS) at the access point (e.g., 3GPP 5G base station (gNB)) introduce panels with multiple antenna elements to create aggressive beamforming both for downlink and uplink.

AAS allows for directivity in both transmission and reception, by means of beamforming. In transmission, beamforming focuses the transmitted energy in a certain area, a beam, and thereby increases the signal-to-noise ratio (SNR) at the receiver end. Similarly, beamforming at the receiver increases SNR of the received signal from a beam. The more directivity, i.e. the narrower beam, the higher is the gain in SNR: the beamforming gain. Beamforming is therefore used to enhance coverage in a mobile communications system, both in downlink and in uplink. Beamforming may be achieved by analog processing, so-called analog beamforming, or with digital processing (digital beamforming). Analog beamforming limits the beamforming to one beam at a time whereas digital beamforming allows for transmission or reception in different beams simultaneously.

With increasing radio frequency beamforming becomes increasingly important in a mobile communications system to achieve coverage and is an important part of e.g. millimeter wave systems operating at tens of GHz. 3GPP NR is a mobile communications system designed to operate up to 52 GHz.

To reduce the cost of AAS, primarily analog beamforming is used (in other words time-domain beamforming). Also, at the UE side analog beamforming is expected for FR2; this means the UE can only receive a transmission on one beam from the AAS at a time since its spatial reception filter applies to all resource elements of an OFDM symbol (per polarization). Note that for FR2 all bands are Time Division Duplexed (TDD).

In NR, downlink channels for initial access are multiplexed in an SSB (see 3GPP TS 38.211 V15.8.0 ("TS 38.211")). Multiple SSBs may be transmitted sequentially in beams, which are swept to cover an entire cell. To limit the time resources needed to sweep the entire cell, these beams are typically quite wide. Once a UE is connected, a beam refinement procedure may take place, for example by letting the UE measure on reference signals (e.g., CSI-RS) in a set of narrow beams and report the best narrow beam to the network (see 3GPP TS 38.214 V15.9.0 ("TS 38.214")).

A cell is configured with a mapping from SSB index to PRACH occasions and to sets of preamble indices as explained in TS 38.213. The configuration is conveyed to the UEs, e.g. via broadcast (see 3GPP TS 38.331 V15.8.0 ("TS 38.331")). One or more SSB indices may be mapped to the same PRACH occasion but then to different preamble indices, a mapping procedure prescribed by 3GPP (see TS 38.331). One PRACH occasion can be viewed as containing no more than 64 preamble indices, so it is this set of preamble indices that need to be distributed to the different SSBs (e.g. if there is only one SSB associated to the PRACH occasion then it could be mapped to all 64 preamble indices).

Even if analog beamforming is the norm for highband deployment simply due to the extensive signal processing needed to operate the many antenna elements, one may consider digital beamforming for some transmissions that for one reason or another exploit only a subset of resources (and therefore relieve the burden of signal processing).

Such transmissions could be on the PRACH channel covering a limited range in frequency. Digital beamforming of PRACH, e.g. by means of a narrow-band receiver, enables detection of preambles in several beams simultaneously so that beam sweeping can be avoided. By using narrow beams for PRACH detection, the gNB may acquire the UE direction immediately and avoid further beam refinement. Narrow beams also improve beamforming gain and hence coverage compared to wide beams. By using narrow beams and comparing the received signal energy from the random access preamble in the set of narrow beams, the narrow beam with the highest received signal energy can be selected for further transmission of downlink channels such as PDCCH and PDSCH and for uplink channels such as PUCCH and PUSCH.

PRACH preambles in NR are generated from Zadoff-Chu sequences, as described in reference TS 38.211. A preamble consists of one or more periods of the Zadoff-Chu sequence plus a cyclic prefix. The key point is that a sequence is unique (for each preamble index). Based on how the received sequence is shifted in time it is also possible to estimate the propagation delay.

A typical PRACH detector is described in reference [1]. A bandpass filter is followed by a bank of correlators for the configured preamble sequences in the cell. The correlator output for different periods, if more than one period, of the periodic preamble may be combined either coherently or non-coherently. In the former case the complex correlator output from the different periods are summed, in the latter case the energy, i.e. the amplitude squared, of the correlator output is summed. Furthermore, the correlator outputs from different receive polarizations are added non-coherently.

Once a combined signal is formed from the correlator outputs, a preamble is detected if the energy scaled by the estimated noise energy for any sample within the possible range of delays in the combined signal exceeds a threshold. The sample with the highest energy also gives the estimated delay.

A straightforward solution to obtain high sensitivity for PRACH and to find narrow beams for subsequent transmissions and receptions is to first perform digital beamforming of the incoming signals into narrow beams, apply a PRACH detector to each beam and use the beam with the highest received energy for a preamble for subsequent transmissions and receptions.

SUMMARY

Certain challenges presently exist. For instance, in a typical mmW system there may be hundreds of narrow beams. Baseband processing for such large numbers of narrow beams becomes exceedingly complex.

Accordingly, this disclosure describes a procedure that finds the best narrow beam in a more efficient manner. In a first step, the access point correlates the incoming signal with appropriate preambles for a set of wide beams and then selects at least one candidate preamble for further processing in at least one set of narrow beams that all reside within the coverage area of the wide beam with which the candidate preamble is associated. For each candidate, a second step is executed including narrow beamforming and a PRACH receiver chain including threshold comparison.

What is gained by this approach is two-fold: (i) correlation with Zadoff-Chu sequences considering all delays only for wide beams (and associated preamble indices); (ii) correlation with Zadoff-Chu sequences in the second step only for delays identified in first step and only assuming the narrow beams related to the wide beam as identified in previous step. This is much less computationally complex than a brute-force approach where correlation with Zadoff-Chu sequences involving all delays for all narrow bands and appropriate preamble indices need to be calculated.

Another challenge is that UEs in a cell served by an access point access the network in an uncoordinated manner. This means that several UEs that are in the same wide beam coverage of an SSB may select the same preamble index in the same PRACH occasion. Using a wide beam to respond to the colliding UEs can resolve the ambiguity such that only one UE is finally served. The other UEs would fail the random access attempt, and these failure UEs would have to perform the random access procedure a second time. Accordingly, this disclosure also provides a procedure for resolving preamble collisions such that more than one UE can successfully perform the random access procedure.

In one aspect there is provided a method for detecting a random access preamble (RAP) transmitted by a first UE. The method is performed by an access point. The method includes receiving a signal transmitted by the first UE, wherein the signal comprises the RAP. The method also includes processing the signal using a first receive, RX, beam to produce a first beamformed signal, wherein the first RX beam is associated with a set of RAPs, the set of RAPs comprising a first RAP and a second RAP. The method also includes using the first beamformed signal and the first RAP, determining a first set of one or more energy values for the first RAP, wherein determining the first set of energy values for the first RAP comprises correlating the first beamformed signal with the first RAP. The method also includes using the first beamformed signal and the second RAP, determining a second set of one or more energy values for the second RAP, wherein determining the second set of energy values for the second RAP comprises correlating the first beamformed signal with the second RAP. The method also includes selecting a set of one or more candidate RAPs using the first set of energy values and the second set of energy values, wherein the set of candidate RAPs includes at least a first candidate RAP. The method also includes selecting a second RX beam that is narrower than the first RX beam. The method also includes processing the signal transmitted by the first UE using the second RX beam to produce a second beamformed signal using the second beamformed signal and the first candidate RAP, determining a third set of one or more energy values for the first candidate RAP, wherein determining the third set of energy values comprises correlating the second beamformed signal with the first candidate RAP. The method further includes using the third set of energy values, determining whether the first candidate RAP matches the RAP transmitted by the first UE.

In another aspect there is provided an access point that is adapted to perform the methods disclosed herein. In some embodiments, the access point comprises a memory and a processing unit coupled to the memory. In another aspect there is provided a computer program comprising instructions which when executed by processing circuitry of an access point causes the access point to perform any of the methods disclosed herein. In another aspect there is provided a carrier containing the computer program, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
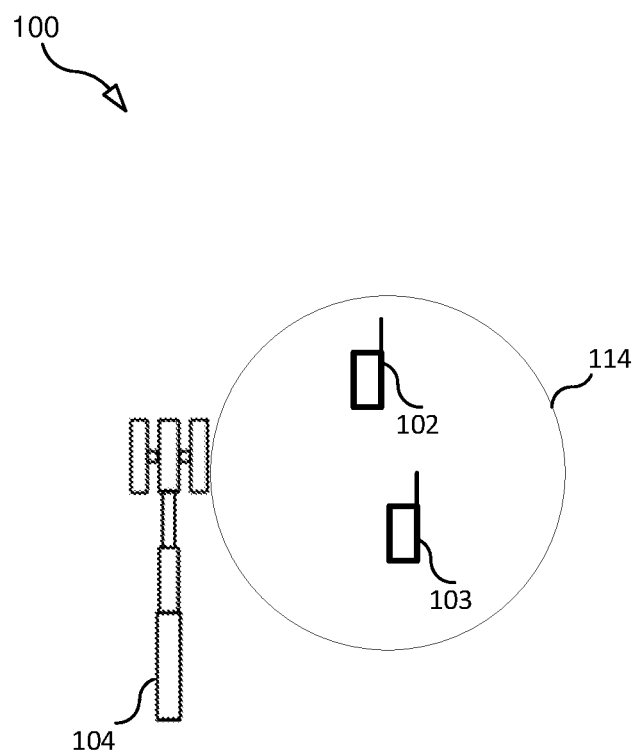
FIG. 1 illustrates a communications network according to an embodiment.

FIG. 1 illustrates a communications network 100 according to an embodiment. In the example embodiment shown, communications network 100 includes a first access point 104 (e.g., a gNB) serving a cell in which a UE 102 and a second UE 103 are located. More specifically, UE 102 and UE 103 are both within the coverage of a particular wide receive (RX) beam 114 generated by access point 104. While only a single access point and two UEs are shown, this was done solely for the sake of brevity because communications network 100 can include virtually any number of access points and UEs.

In one embodiment, UEs 102 and 103 receive system information broadcast by access point 104 using wide beam 114, which system information enables the UEs to select a random-access preamble (RAP) from a set of RAPs associated with the wide beam 114 and use the selected RAP for a random access procedure. As noted above, it is possible that both UEs will select the same RAP and transmit the RAP at the same time.

As discussed above, it can be advantageous for access point 104 to, for each UE, find a narrow RX beam that covers the area in which the UE is located so that the access point 104 can use the narrow RX beam to communicate with the UE.

Accordingly, this disclosure describes processes for RAP detection. One process (see FIG. 2) results in candidate RAPs and associated delays for a second process (see FIG. 3) that gives, in addition to a detected RAP and time-of-arrival estimate (delay), a narrow beam that can be used for subsequent transmission to and reception from a UE of physical channels and signals with good coverage.

In the first process wide RX beams are formed by, in one embodiment, digital beamforming of the received antenna signals. It is advantageous to use RX beams for PRACH reception such that each RX beam covers the whole or part of a beam for a single SSB block, because for such a RX beam only the preambles mapped from the SSB block need to be correlated with the incoming signal and hence baseband processing load is limited.

Once the wide beams are formed, each beamformed signal, typically with two different polarizations, is processed like in a normal PRACH detector, along the lines in reference [1]. However, detection is not performed in this process (i.e. there is no decision whether any RAP has been received or not and there is no need for a comparison to a RAP detection threshold). Because there is no RAP detection threshold comparison the received SNR may be lower than if detection were performed. Instead of detecting a RAP, candidate RAPs for detection are obtained by selecting the N highest peaks or from comparing received energy (e.g., SNR) to a moderate threshold (resulting in N candidates) from the antenna combiner outputs. This "moderate threshold" is lower than a conventional RAP detection threshold. In one embodiment the peak with highest energy from each preamble and receiver beam is selected. Among those peaks the N peaks with highest received energy are then selected.

Figure 2:
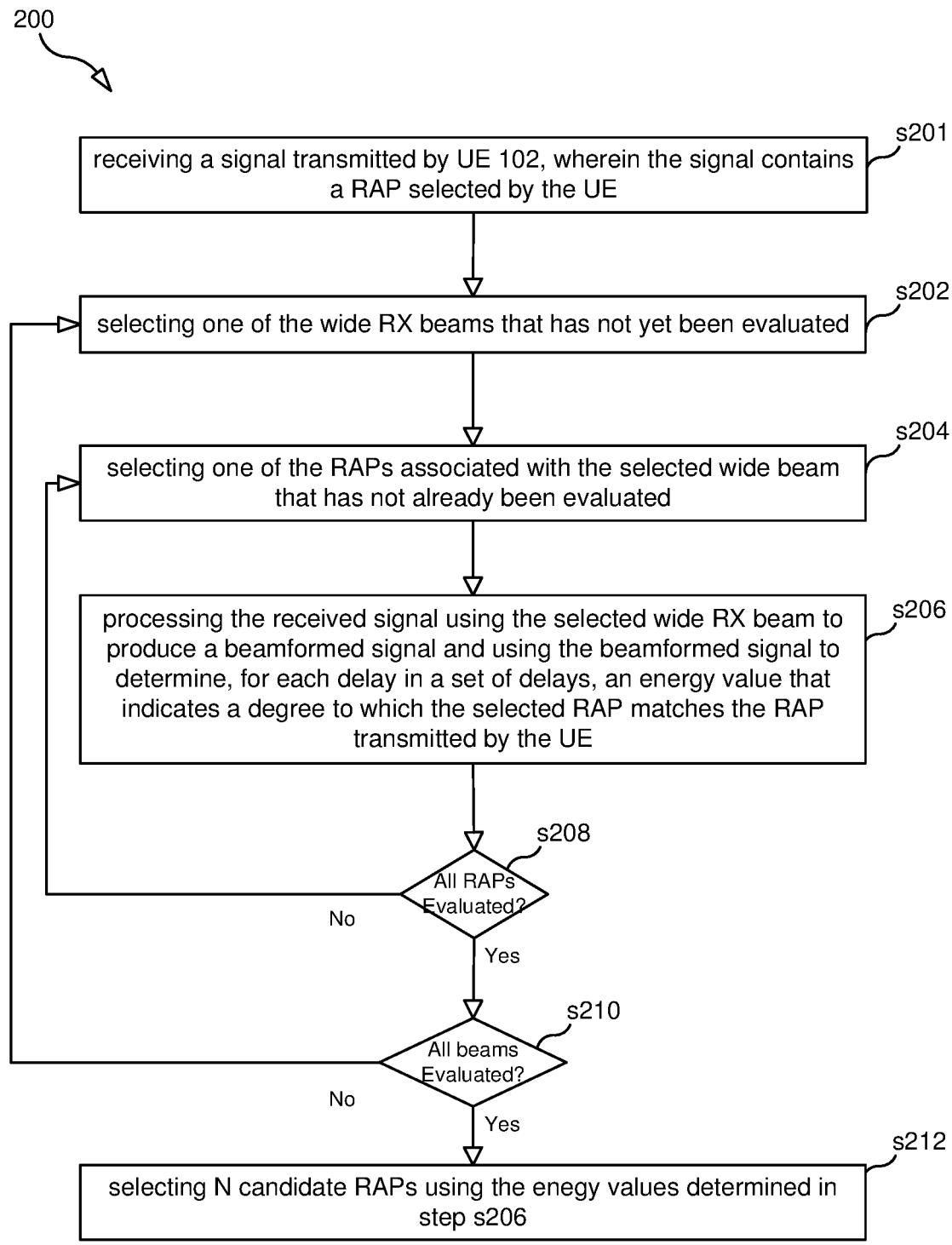
FIG. 2 is a flowchart illustrating a process according to some embodiments.

FIG. 2 is a flowchart illustrating a process 200, according to some embodiments, performed by access point 104 to select the set of N (N>0) candidate RAPs. Process 200 may begin in step s201.

Step s201 comprises access point 104 receiving a signal transmitted by UE 102, wherein the signal contains a RAP selected by UE 102.

Step s202 comprises access point 104 selecting one of its wide RX beams that has not yet been evaluated (e.g., beam 114).

Step s204 comprises access point 104 selecting one of the RAPs associated with the selected wide beam that has not already been evaluated (as described herein, each wide beam is associated with a set of one or more RAPs).

Step s206 comprises access point 104 processing the received signal using the selected wide RX beam to produce a beamformed signal and using the beamformed signal to determine, for each delay in a set of delays, an energy value that indicates a degree to which the selected RAP matches the RAP transmitted by the UE. As used herein the term "energy value" is used broadly to encompass a signal-to-noise ratio (SNR). This step can be performed using a conventional peak detector as described in reference [1]. As described and shown in reference [1] (see, e.g., FIGS. 17.26 and 17.27 of reference [1]), a bandpass filter is followed by a bank of correlators for the configured preamble sequences (referred to as "signatures" in FIGS. 17.26 and 17.27) in the cell. The correlator output for different periods, if more than one period, of the periodic preamble may be combined either coherently or non-coherently. In the former case the complex correlator output from the different periods are summed, in the latter case the energy, i.e. the amplitude squared, of the correlator output is summed. Furthermore, the correlator outputs from different receive polarizations are added non-coherently. That is, for example, step s206 comprises correlating the beamformed signal with the selected RAP and combining outputs of the correlators. As a result of performing step s206, access point 104 will have a set of energy values for the selected wide beam and the selected RAP, where each energy value is associated with a particular delay.

Step s208 comprises the access point determining whether it has evaluated all of the RAPs included in the set of RAPs associated with the selected wide RX beam. If there is a RAP that has not been evaluated, the process goes back to step s204, otherwise process 200 proceeds to step s210.

Step s210 comprises access point determining whether it has evaluated all of its wide RX beams. If there is a wide RX beam that has not been evaluated, the process goes back to step s202, otherwise process 200 proceeds to step s212.

Once all of the wide RX beams have been evaluated, access point 104 will have a set of energy data for each RAP that will enable access point to select one or more candidate RAPs. The set of energy data for each RAP comprises a plurality of 2-tuples where each 2-tuple consists of an energy value and a delay value, as illustrated in Table 1 below, which shows the energy value/delay value 2-tuples for the ith RAP (RAP_i).

TABLE 1

Energy Data for RAP_i

| Delay | Energy |
|---|---|
| D1 | E1 |
| D2 | E2 |
| ... | ... |
| Dn | En |

Step s212 comprises access point 104 selecting N candidate RAPs (e.g., N>0). In one embodiment, access point 104 selects the N RAPs by selecting the N RAPs having the highest energy value; in another embodiment access point 104 selects the N RAPs by selecting RAPs with an energy that exceed a moderate threshold (i.e., a threshold that is lower than a conventional RAP detection energy threshold). Thus, for example, if energy value E2 for RAP_i is the highest (peak) energy value for RAP_i and E2 is greater than all other energy values for the other RAPs or if E2 is greater than some moderate threshold, then RAP_i will be one of the selected candidate RAPs.

Figure 3:
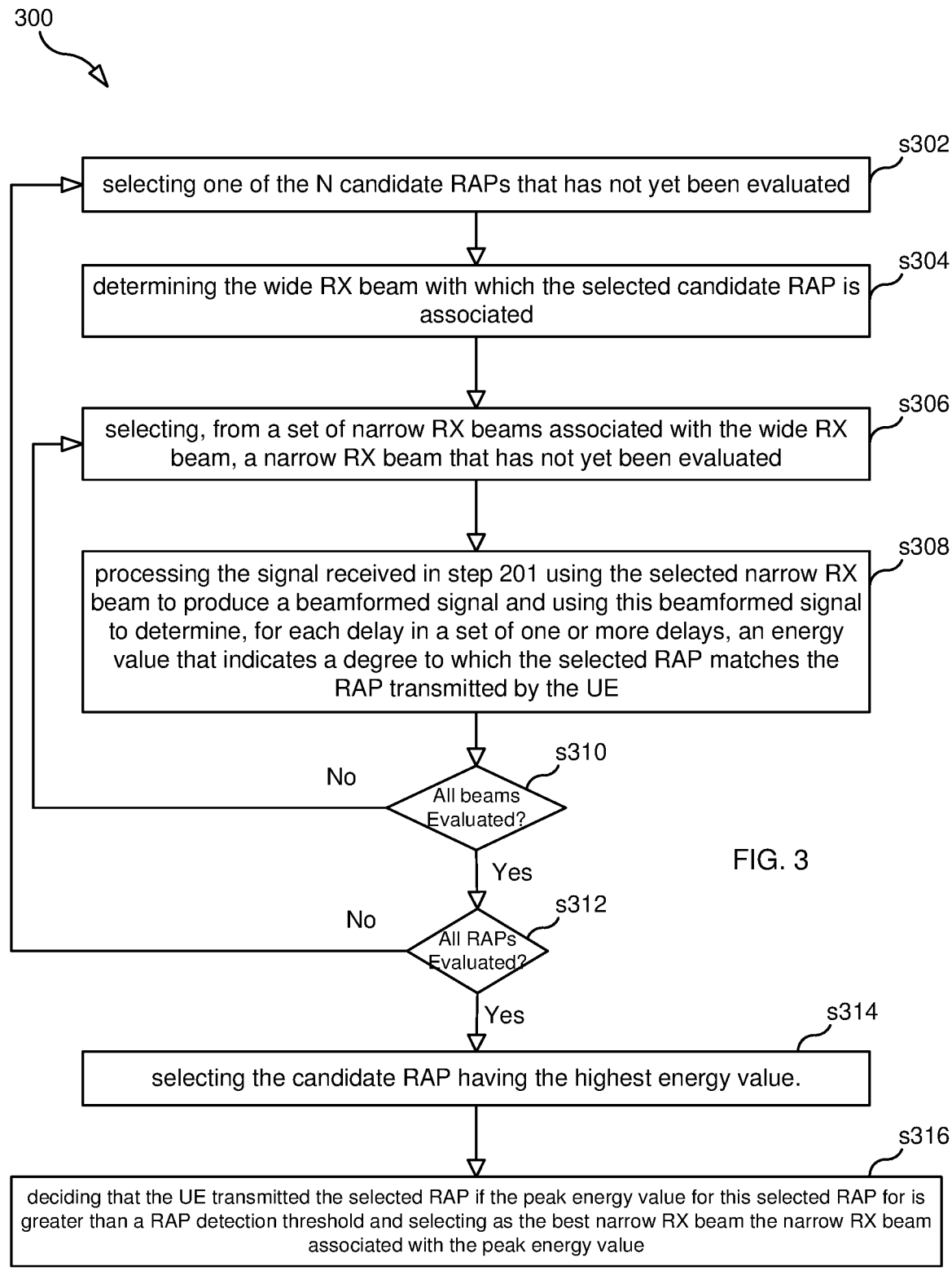
FIG. 3 is a flowchart illustrating a process according to some embodiments.

FIG. 3 is a flowchart illustrating a process 300, according to one embodiment, that is performed by access point 104 after it performs process 200. Process 300 is a process for access point 104 to find a narrow RX beam that covers the location of the UE. Process 300 may begin in step s302.

Step s302 comprises selecting one of the N candidate RAPs that has not yet been evaluated.

Step s304 comprises determining the wide RX beam with which the selected candidate RAP is associated, wherein for the determined wide RX beam there exists a set of narrow RX beams that each has a coverage area within the coverage area of the wide RX beam.

Step s306 comprises selecting, from said set of narrow RX beams, a narrow RX beam that has not yet been evaluated.

Step s308 comprises access point 104 processing the signal received in step 201 using the selected narrow RX beam to produce a beamformed signal and using this beamformed signal to determine, for each delay in a set of one or more delays, an energy value that indicates a degree to which the selected RAP matches the RAP transmitted by the UE. In some embodiments, the set of delays includes only a single delay (i.e., the delay associated with the peak energy value for the candidate RAP). This step s308 can be performed using a conventional peak detector as described in reference [1]. That is, for example, step s308 comprises correlating the beamformed signal with the selected RAP and combining outputs of the correlators. As a result of performing step s308, access point 104 will have a set of one or more energy values for the selected narrow RX beam and the selected RAP, where each energy value is associated with a particular delay. Table 2 illustrates an example set of such energy values for the first candidate RAP (C_RAP_1) after step s308 is performed for the first time.

TABLE 2

Energy Data for C_RAP_1 after the first iteration of step s308

| Delay | Energy | Narrow Beam ID |
|---|---|---|
| D1 | E1 | NB_1 |
| D2 | E4 | NB_1 |

Step s310 comprises access point 104 determining whether it has evaluated all of the narrow RX beams included in said set of narrow RX beams. If there is a narrow RX beam that has not been evaluated, the process goes back to step s308, otherwise process 300 proceeds to step s312.

Step s312 comprises the access point determining whether it has evaluated all of the RAPs included in the set of N candidate RAPs. If there is a candidate RAP that has not yet been evaluated, the process goes back to step s302, otherwise process 300 proceeds to step s314.

Once all of candidate RAPs have been evaluated, access point 104 will have a set of energy data for each candidate RAP that will enable access point to determine whether a RAP has been detected and, assuming a RAP has been detected, to further determine a best narrow RX beam to use with the UE. The set of energy data for each candidate RAP comprises a plurality of 3-tuples where each 3-tuple consists of i) an energy value, ii) a delay value, and iii) a narrow beam identifier, as illustrated in Table 3 below, which shows the 3-tuples for the first candidate RAP (C_RAP_1).

TABLE 3

Energy Data for C_RAP_1

| Narrow Beam ID | Energy | Delay |
|---|---|---|
| NB_1 | E1 | D1 |
| NB_1 | E2 | D2 |
| NB_2 | E3 | D1 |
| NB_2 | E4 | D2 |
| NB_3 | E5 | D1 |
| NB_3 | E6 | D2 |

As shown in Table 3, the set of delay values consists of two different delay values: D1 and D2; and the set of narrow RX beams consists of three narrow RX beam: NB_1, NB_2, and NB_3. Thus, Table 3 includes three sets of one or more energy values: 1) a first set for NB_1 (i.e., E1 and E2); 2) a second set for NB_2 (i.e., E3 and E4); and 3) a third set for NB_3 (i.e., E5 and E6).

Step s314 comprises access point 104 selecting the best candidate RAP. In step s314, access point selects the best candidate RAP by selecting the candidate RAP having the highest energy value. Thus, for example, if energy value E2 for C_RAP_1 is the highest (peak) energy value for C_RAP_1 and E2 is greater than all other energy values for the other candidate RAPs, then C_RAP_1 will be declared the best candidate RAP.

Step s316 comprises access point i) deciding that UE 102 transmitted the declared best candidate RAP if the peak energy value (e.g., peak SNR) for this candidate RAP for is greater than a RAP detection threshold and ii) selecting as the best narrow RX beam the narrow RX beam associated with the peak energy value for the best candidate RAP. For example, if C_RAP_1 is the best candidate RAP and E2 is the peak energy value for C_RAP_1, then the best narrow RX beam is NB_1.

As the above demonstrates, for each wide RX beam with at least one candidate RAP, each narrow RX beam within the wide RX beam is beamformed and processed like in a PRACH detector, but only with correlators for those RAPs that are among the candidate RAPs. Since this only involves narrow beamforming and correlation for the candidates, the baseband processing is decreased significantly compared to beamforming for all narrow RX beams or correlation for all preambles. Advantageously, the correlation for each candidate RAP may be limited to the delay as determined in process 200, thus further reducing the baseband processing. In case the correlation is not limited to that delay, peak search is performed as in step 206. Finally, the energy value (e.g., the SNR) of the peak in the narrow-beam detector is compared to a RAP detection threshold. If the peak energy value exceeds the RAP detection threshold, then the RAP is detected.

A RAP detection threshold is in general designed for a certain false-alarm rate and requires a high-enough SNR for low missed-detection probability. Since there is no RAP detection threshold in process 200, the SNR for the wide RX beam does not need to be as high as for a PRACH detector to enable detection of a preamble in process 300. In process 300 the SNR is higher than in the first step due to higher beamforming gain and thus decreases the probability of missed detection. On the other hand, candidates may be due to noise and peaks due to transmitted preambles with a certain delay may be masked by these noise-caused candidates. The masking by noise-caused candidates may imply missed detection and therefore the performance for the proposed PRACH detector may in some circumstances not be as good as for PRACH detectors only using narrow RX beams, but processing load is much lower.

Figure 4:
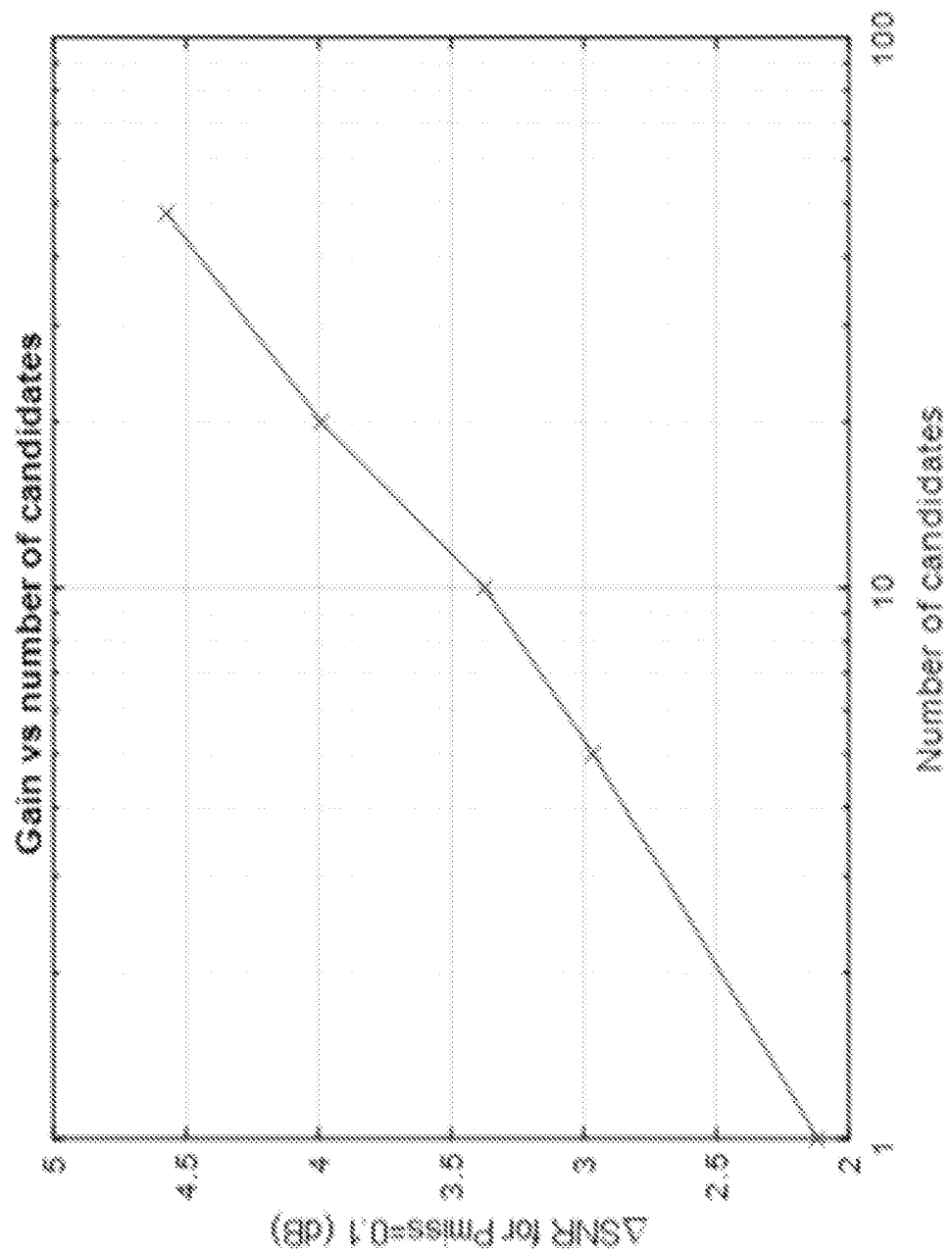
FIG. 4 illustrates performance gain compared to detection for wide beams.

As can be seen in FIG. 4, the above described embodiments perform significantly better than a PRACH detector using wide RX beams only and the performance improves with the number of candidates. The baseband processing load may vary between access points and over time and often the uplink processing load for PUSCH, PUCCH and SRS is low. The number of candidates, N, may therefore increase with decreasing processing load due to other channels than PRACH.

Figure 5:
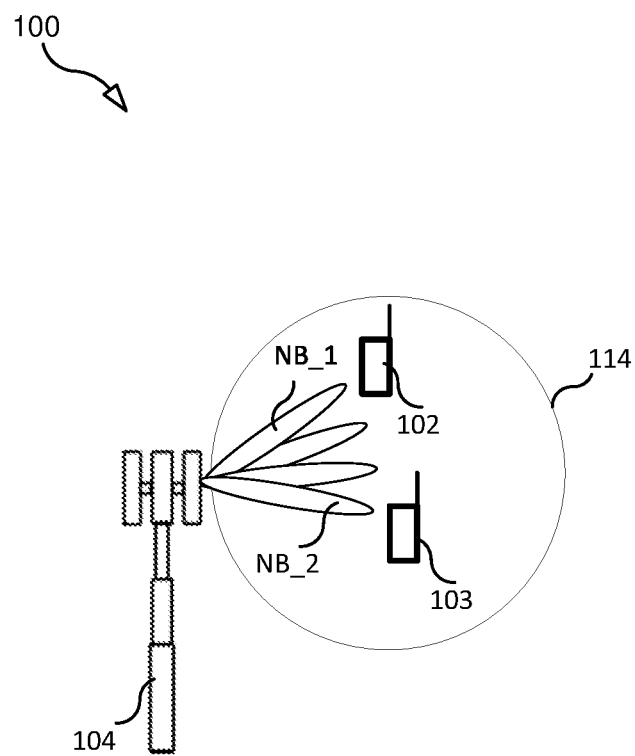
FIG. 5 illustrates two UEs being served by different narrow beams.

As noted above, it may be the case that UE 102 and UE 103, which are both within the coverage of wide RX beam 114, perform the random access procedure at the same time (i.e., within the same PRACH occasion) and select the same RAP for the random access procedure. In this scenario, if UE 102 is within the coverage of a first narrow RX beam NB_1 and UE 103 is within the coverage area of a second narrow RX beam NB_2 (as illustrated in FIG. 5), then it is possible that the best candidate RAP will have two relatively high energy values (i.e., energy values exceeding a threshold): a first high energy value for NB_1 and a second high energy value for NB_2. Accordingly, in one embodiment, access point 104 is configured such that when access point 104 detects that the best candidate RAP has two or more energy values that exceed a threshold and each of these energy values is associated with a different narrow RX beam, then access point 104 determines that two or more UEs are performing the random access procedure at the same time and they coincidently have selected the same RAP; and, accordingly, access point 104 will transmit two or more random access responses, one for each of the UEs that selected the same RAP.

That is, if energy peaks resolve into different narrow RX beams and exceed a threshold high enough to avoid false detection, then access point 104 may continue to prepare RAR for each peak (in other words to each UE responsible for a peak). The RAR transmissions to the different UEs may occur simultaneously in different narrow RX beams (depending on the capability of access point 104), the RAR transmissions may also occur at different points in time (as long as these points in time are within the RAR window). The information in the RAR messages can be specified on an individual basis, e.g. timing advance based on the propagation delay. The point is that all the UEs selecting the same preamble index can be served as long as they can be resolved by the narrow RX beams.

Figure 6:
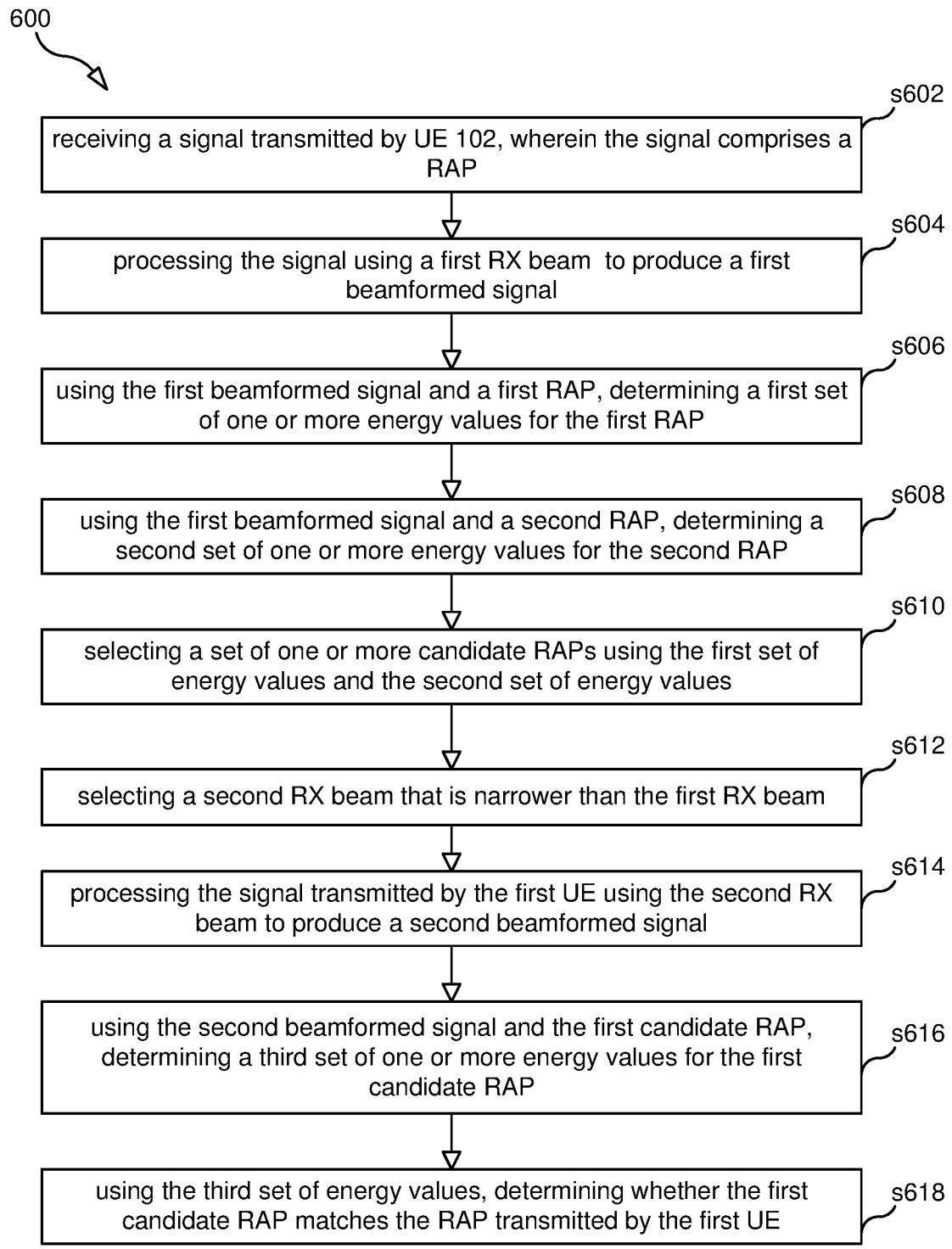
FIG. 6 is a flowchart illustrating a process according to some embodiments.

FIG. 6 is a flowchart illustrating a process 600, according to some embodiments, that is performed by access point 104. Process 600 may begin in step s602.

Step s602 comprises receiving a signal transmitted by UE 102, wherein the signal comprises a RAP.

Step s604 comprises processing the signal using a first RX beam (e.g., wide RX beam 114) to produce a first beamformed signal, wherein the first RX beam is associated with a set of RAPs, the set of RAPs comprising a first RAP and a second RAP.

Step s606 comprises using the first beamformed signal and the first RAP, determining a first set of one or more energy values for the first RAP, wherein determining the first set of energy values for the first RAP comprises correlating the first beamformed signal with the first RAP. For example, the first beamformed signal is correlated with the first RAP using a set of different delays.

Step s608 comprises using the first beamformed signal and the second RAP, determining a second set of one or more energy values for the second RAP, wherein determining the second set of energy values for the second RAP comprises correlating the first beamformed signal with the second RAP. For example, the first beamformed signal is correlated with the second RAP using the set of different delays.

Step s610 comprises selecting a set of one or more candidate RAPs using the first set of energy values and the second set of energy values, wherein the set of candidate RAPs includes at least a first candidate RAP.

Step s612 comprises selecting a second RX beam that is narrower than the first RX beam.

Step s614 comprises processing the signal transmitted by the first UE using the second RX beam to produce a second beamformed signal.

Step s616 comprises using the second beamformed signal and the first candidate RAP, determining a third set of one or more energy values for the first candidate RAP, wherein determining the third set of energy values comprises correlating the second beamformed signal with the first candidate RAP. For example, the second beamformed signal is correlated with the first candidate RAP using a subset of the delays, rather than all of the delays.

Step s618 comprises using the third set of energy values, determining whether the first candidate RAP matches the RAP transmitted by the first UE.

Figure 7:
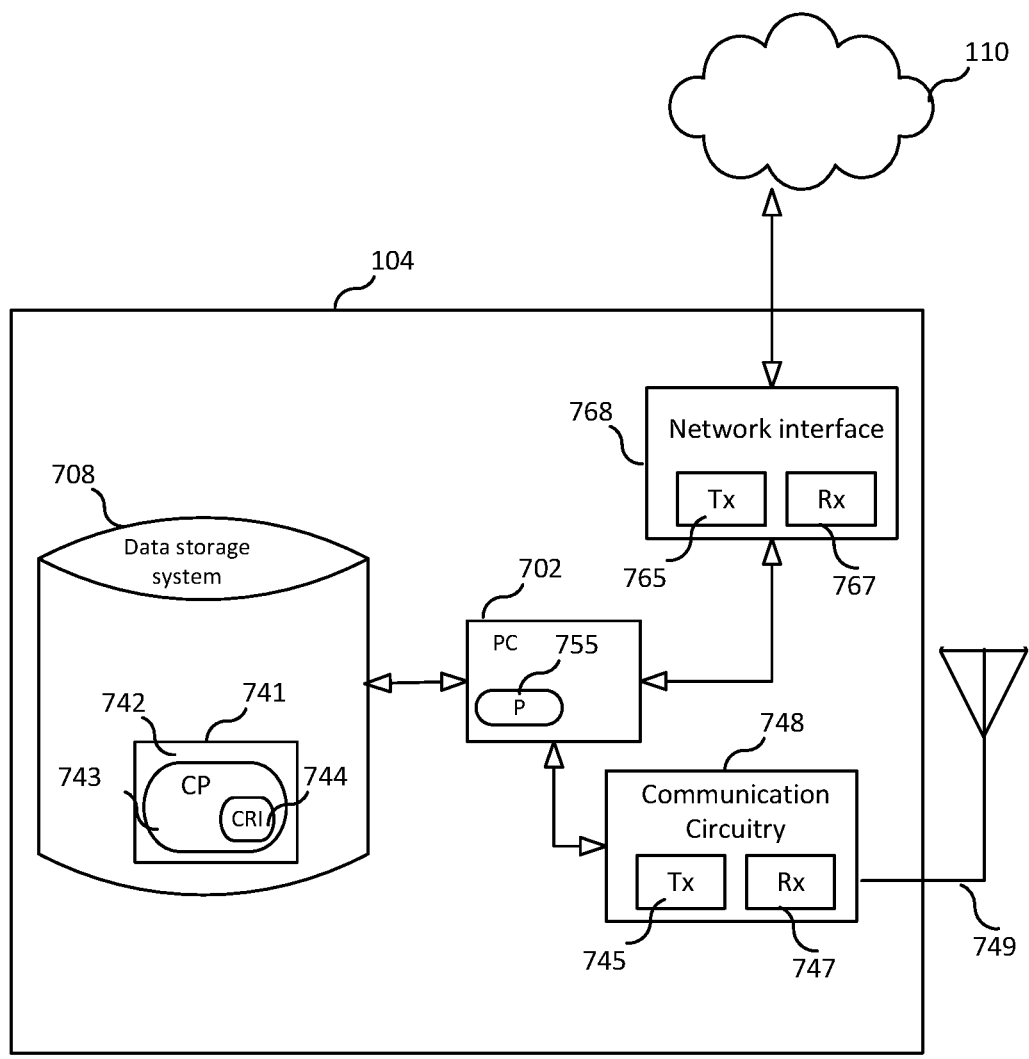
FIG. 7 illustrates an access point according to some embodiments.

FIG. 7 is a block diagram of access point 104, according to some embodiments. As shown in FIG. 7, access point 104 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., access point 104 may be a distributed computing apparatus such that, for example, a baseband unit of access point 104 may not be co-located with a radio unit of access point 104); a network interface 768 comprising a transmitter (Tx) 765 and a receiver (Rx) 767 for enabling access point 104 to transmit data to and receive data from other nodes connected to a network 110 (e.g., an Internet Protocol (IP) network) to which network interface 768 is connected; communication circuitry 748, which is coupled to an antenna arrangement 749 comprising one or more antennas and which comprises a transmitter (Tx) 745 and a receiver (Rx) 747 for enabling access point 104 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes access point 104 to perform steps described herein (e.g., steps described herein with reference to the flow charts). In other embodiments, access point 104 may be configured to perform steps described herein without the need for code. That is, for example, PC 702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] "LTE—The UMTS Long Term Evolution", chapter 17.5.2, Editors S. Sesia, I. Toufik, M. Baker, John Wiley and Sons Ltd, 2011

| Abbreviations | |
|---|---|
| AAS | Advanced Antenna System |
| CSI-RS | Channel State Information Reference Signal |
| FR | Frequency Range |
| PDCCH | Physical Downlink Control Channel |
| PDSCH | Physical Downlink Shared Channel |
| PUCCH | Physical Uplink Control Channel |
| PUSCH | Physical Uplink Shared Channel |
| RAR | Random Access Response |
| SSB | Synchronization Signal Block |
| UE | User Equipment |

The invention claimed is:

1. A method for detecting a random access preamble (RAP) transmitted by a first user equipment (UE), the method comprising:
receiving a signal transmitted by the first UE, wherein the signal comprises the RAP;
processing the signal using a first receive (RX) beam to produce a first beamformed signal, wherein the first RX beam is associated with a set of RAPs, the set of RAPs comprising a first RAP and a second RAP;
using the first beamformed signal and the first RAP, determining a first set of one or more energy values for the first RAP, wherein determining the first set of energy values for the first RAP comprises correlating the first beamformed signal with the first RAP;
using the first beamformed signal and the second RAP, determining a second set of one or more energy values for the second RAP, wherein determining the second set of energy values for the second RAP comprises correlating the first beamformed signal with the second RAP;
selecting a set of one or more candidate RAPs using the first set of energy values and the second set of energy values, wherein the set of candidate RAPs includes at least a first candidate RAP;
selecting a second RX beam that is narrower than the first RX beam;
processing the signal transmitted by the first UE using the second RX beam to produce a second beamformed signal;
using the second beamformed signal and the first candidate RAP, determining a third set of one or more energy values for the first candidate RAP, wherein determining the third set of energy values comprises correlating the second beamformed signal with the first candidate RAP; and
using the third set of energy values, determining whether the first candidate RAP matches the RAP transmitted by the first UE.

2. The method of claim 1, further comprising:
as a result of determining that the first candidate RAP matches the RAP transmitted by the first UE, selecting the second RX beam for use in communicating with the first UE; and
using the second RX beam to process a further signal transmitted by the first UE.

3. The method of claim 1, wherein
the first RX beam is associated with a set of RX beams wherein each RX beam included in the set of RX beams is narrower than the first RX beam, and
the second RX beam is included in the set of RX beams associated with the first RX beam.

4. The method of claim 3, wherein the step of selecting a second RX that is narrower than the first RX beam comprises:
determining that the first candidate RAP is associated with the first RX beam; and
as a result of determining that the first candidate RAP is associated with the first RX beam, selecting an RX beam from the set of RX beams.

5. The method of claim 1, wherein
the coverage area of the second RX beam is completely within the coverage area of the first RX beam.

6. The method of claim 1, wherein the step of determining whether the first candidate RAP matches the RAP transmitted by the first UE comprising determining whether the third set of energy values includes an energy value that satisfies a threshold.

7. The method of claim 6, wherein a third RX beam is included in the set of RX beams associated with the first RX beam, and the method further comprises:
processing the signal transmitted by the first UE using the third RX beam to produce a third beamformed signal; and
using the third beamformed signal and the first candidate RAP, determining a fourth set of one or more energy values for the first candidate RAP, wherein determining the fourth set of energy values comprises correlating the third beamformed signal with the first candidate RAP.

8. The method of claim 7, wherein the step of determining whether the first candidate RAP matches the RAP transmitted by the first UE further comprises determining whether the fourth set of energy values includes an energy value that satisfies a threshold.

9. The method of claim 8, further comprising:
determining that the third set of energy values includes an energy value that satisfies the threshold;
determining that the fourth set of energy values includes an energy value that satisfies the threshold; and
as a result of determining that both the third set of energy values and the fourth set of energy values includes an energy values that satisfies the threshold, determining that at least the first UE and a second UE transmitted the first candidate RAP.

10. The method of claim 9, further comprising:
as a result of determining that at least the first UE and a second UE transmitted the first candidate RAP, transmitting a first random access response (RAR) for the first UE and transmitting a second RAR for the second UE.

11. The method of claim 10, wherein the first RAR and the second RAR are transmitted simultaneously.

12. The method of claim 10, wherein the first RAR and the second RAR are transmitted at different points in time within a RAR window.

13. The method claim 1, further comprising:
processing the signal using a third RX beam to produce a third beamformed signal, wherein the third RX beam is associated with a set of RAPs, the set of RAPs comprising a third RAP and a fourth RAP;
using the third beamformed signal and the third RAP, determining a fourth set of one or more energy values for the third RAP, wherein determining the fourth set of energy values for the third RAP comprises correlating the third beamformed signal with the third RAP;
using the third beamformed signal and the fourth RAP, determining a fifth set of one or more energy values for the fourth RAP, wherein determining the fifth set of energy values for the fourth RAP comprises correlating the third beamformed signal with the fourth RAP; and
selecting the set of one or more candidate RAPs using the first set of energy values, the second set of energy values, the fourth set of energy values, and the fifth set of energy values.

14. The method of claim 13, wherein selecting the set of one or more candidate RAPs comprises comparing a first peak energy value from the first set of energy values to a second peak energy value from the second set of energy values.

15. The method of claim 13, further comprising including the first RAP in the set of candidate RAPs as a result of determining that the first peak energy value is greater than every other peak energy value included in a set of peak energy values that includes the first peak energy values, the second peak energy values, a peak energy value from the fourth set of energy values, and a peak energy value from the fifth set of energy values.

16. A non-transitory computer readable storage medium storing a computer program comprising instructions which when executed by processing circuitry of an access point causes the access point to perform the method of claim 1.

17. An access point, the access point comprising:
processing circuitry; and
a memory, the memory containing instructions executable by the processing circuitry, wherein the access point is configured to perform a method comprising:
receiving a signal transmitted by the first UE, wherein the signal comprises the RAP;
processing the signal using a first receive (RX) beam to produce a first beamformed signal, wherein the first RX beam is associated with a set of RAPs, the set of RAPs comprising a first RAP and a second RAP;
using the first beamformed signal and the first RAP, determining a first set of one or more energy values for the first RAP, wherein determining the first set of energy values for the first RAP comprises correlating the first beamformed signal with the first RAP;
using the first beamformed signal and the second RAP, determining a second set of one or more energy values for the second RAP, wherein determining the second set of energy values for the second RAP comprises correlating the first beamformed signal with the second RAP;
selecting a set of one or more candidate RAPs using the first set of energy values and the second set of energy values, wherein the set of candidate RAPs includes at least a first candidate RAP;
selecting a second RX beam that is narrower than the first RX beam;
processing the signal transmitted by the first UE using the second RX beam to produce a second beamformed signal;
using the second beamformed signal and the first candidate RAP, determining a third set of one or more energy values for the first candidate RAP, wherein determining the third set of energy values comprises correlating the second beamformed signal with the first candidate RAP; and
using the third set of energy values, determining whether the first candidate RAP matches the RAP transmitted by the first UE.

18. The access point of claim 17, further comprising:
as a result of determining that the first candidate RAP matches the RAP transmitted by the first UE, selecting the second RX beam for use in communicating with the first UE; and
using the second RX beam to process a further signal transmitted by the first UE.

19. The access point of claim 17, wherein
the first RX beam is associated with a set of RX beams wherein each RX beam included in the set of RX beams is narrower than the first RX beam, and
the second RX beam is included in the set of RX beams associated with the first RX beam.

20. The access point of claim 19, wherein the step of selecting a second RX that is narrower than the first RX beam comprises:
determining that the first candidate RAP is associated with the first RX beam; and
as a result of determining that the first candidate RAP is associated with the first RX beam, selecting an RX beam from the set of RX beams.

\* \* \* \* \*